United States Patent
Loh et al.

(10) Patent No.: US 12,360,907 B2
(45) Date of Patent: Jul. 15, 2025

(54) REGION PATTERN-MATCHING HARDWARE PREFETCHER

(71) Applicant: Advanced Micro Devices, Inc., Santa Clara, CA (US)

(72) Inventors: Gabriel H. Loh, Bellevue, WA (US); Marko Scrbak, Austin, TX (US); Akhil Arunkumar, Sunnyvale, CA (US); John Kalamatianos, Boxborough, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/957,795

(22) Filed: Sep. 30, 2022

(65) Prior Publication Data
US 2024/0111677 A1 Apr. 4, 2024

(51) Int. Cl.
*G06F 12/0862* (2016.01)
*G06F 12/0811* (2016.01)
*G06F 12/0877* (2016.01)

(52) U.S. Cl.
CPC ...... *G06F 12/0862* (2013.01); *G06F 12/0877* (2013.01); *G06F 12/0811* (2013.01)

(58) Field of Classification Search
CPC ............. G06F 12/0862; G06F 12/0877; G06F 12/0811
See application file for complete search history.

(56) References Cited

U.S. PATENT DOCUMENTS

| | | | |
|---|---|---|---|
| 7,519,777 B1 | 4/2009 | Ekanadham et al. | |
| 11,599,473 B1* | 3/2023 | Lafford | G06F 12/0862 |
| 2010/0262750 A1* | 10/2010 | Deshpande | G06F 12/0862 711/3 |
| 2015/0026413 A1 | 1/2015 | Meier et al. | |
| 2017/0083443 A1 | 3/2017 | Wang et al. | |
| 2017/0091104 A1* | 3/2017 | Rafacz | G06F 12/0862 |
| 2018/0052779 A1* | 2/2018 | McCauley | G06F 12/12 |
| 2021/0073134 A1 | 3/2021 | Allu et al. | |
| 2021/0240619 A1 | 8/2021 | Earnshaw | |
| 2021/0406183 A1 | 12/2021 | Mashimo et al. | |
| 2022/0058132 A1* | 2/2022 | Roberts | G06F 12/0862 |

OTHER PUBLICATIONS

Jevdjic, D., et. al., "Die-Stacked DRAM Caches for Servers: Hit Ratio, Latency, or Bandwidth? Have it All with Footprint Cache", Proceedings of the 40th International Symposium on Computer Architecture, Jun. 2013, 12 pgs.
Jevdjic, D., et. al., "Unison Cache: A Scalable and Effective Die-Stacked DRAM Cache", Proceedings of the 47th Annual IEEE/ACM International Symposium on Microarchitecture, 2014, 13 pgs.
Bakhshalipour, M., et. al., "Bingo Spatial Data Prefetcher", Proceedings of the 25th International Symposium on High-Performance Computer Architecture, IEEE, 2019, 14 pgs.

(Continued)

*Primary Examiner* — Baboucarr Faal
(74) *Attorney, Agent, or Firm* — Volpe Koenig

(57) ABSTRACT

A method for performing prefetching operations is disclosed. The method includes storing a recorded access pattern indicating a set of accesses for a region; in response to an access within the region, fetching the recorded access pattern; and performing prefetching based on the access pattern.

21 Claims, 6 Drawing Sheets

(56) References Cited

OTHER PUBLICATIONS

Kumar, S., & Wilkerson, C., "Exploiting Spatial Locality in Data Caches using Spatial Footprints", Proceedings of the 25th Annual ACM/IEEE International Symposium on Computer Architecture, 1998, 12 pgs.
Somogyi, S., et. al., "Spatial Memory Streaming", Proceedings of the 33rd Annual International Symposium on Computer Architecture, Jun. 2006, 12 pgs.
Cantin, J. F., et. al., "Stealth Prefetching", ASPLOS '06, ACM, 2006, 9 ogs.
Chen, C. F., et. al., "Accurate and Complexity-Effective Spatial Pattern Prediction", Proceedings of the 10th International Symposium on High Performance Architecture, Feb. 2004, 12 pgs.
Shii, Y., et al., "Access Map Pattern Matching for High Performance Data Cache Prefetch", Journal of Instruction-Level Parallelism, 13.2011, 2011, 24 pgs.
Shevgoor, M., et. al., "Efficiently Prefetching Complex Address Patterns", MICRO-48, ACM, 2015, 12 pgs.
Kim, J., et. al., "Path Confidence based Lookahead Prefetching", 49th Annual IEEE/ACM International Symposium on Microarchitecture, IEEE, Oct. 2016, 12 pgs.
Jaccard, P., "The Distribution of the Flora in the Alpine Zone", The New Phytologist, vol. XI, No. 2, Feb. 1912, 15 pgs.

\* cited by examiner

Pattern Observation Table Eviction

Prefetching

US 12,360,907 B2

REGION PATTERN-MATCHING HARDWARE PREFETCHER

BACKGROUND

Caches improve performance by storing copies of data considered likely to be accessed again in the future into a low latency cache memory. Improvements to cache technologies are constantly being made.

BRIEF DESCRIPTION OF THE DRAWINGS

A more detailed understanding can be had from the following description, given by way of example in conjunction with the accompanying drawings wherein.

DETAILED DESCRIPTION

A method for performing prefetching operations is disclosed. The method includes storing a recorded access pattern indicating a set of accesses for a region; in response to an access within the region, fetching the recorded access pattern; and performing prefetching based on the access pattern.

Figure 1:
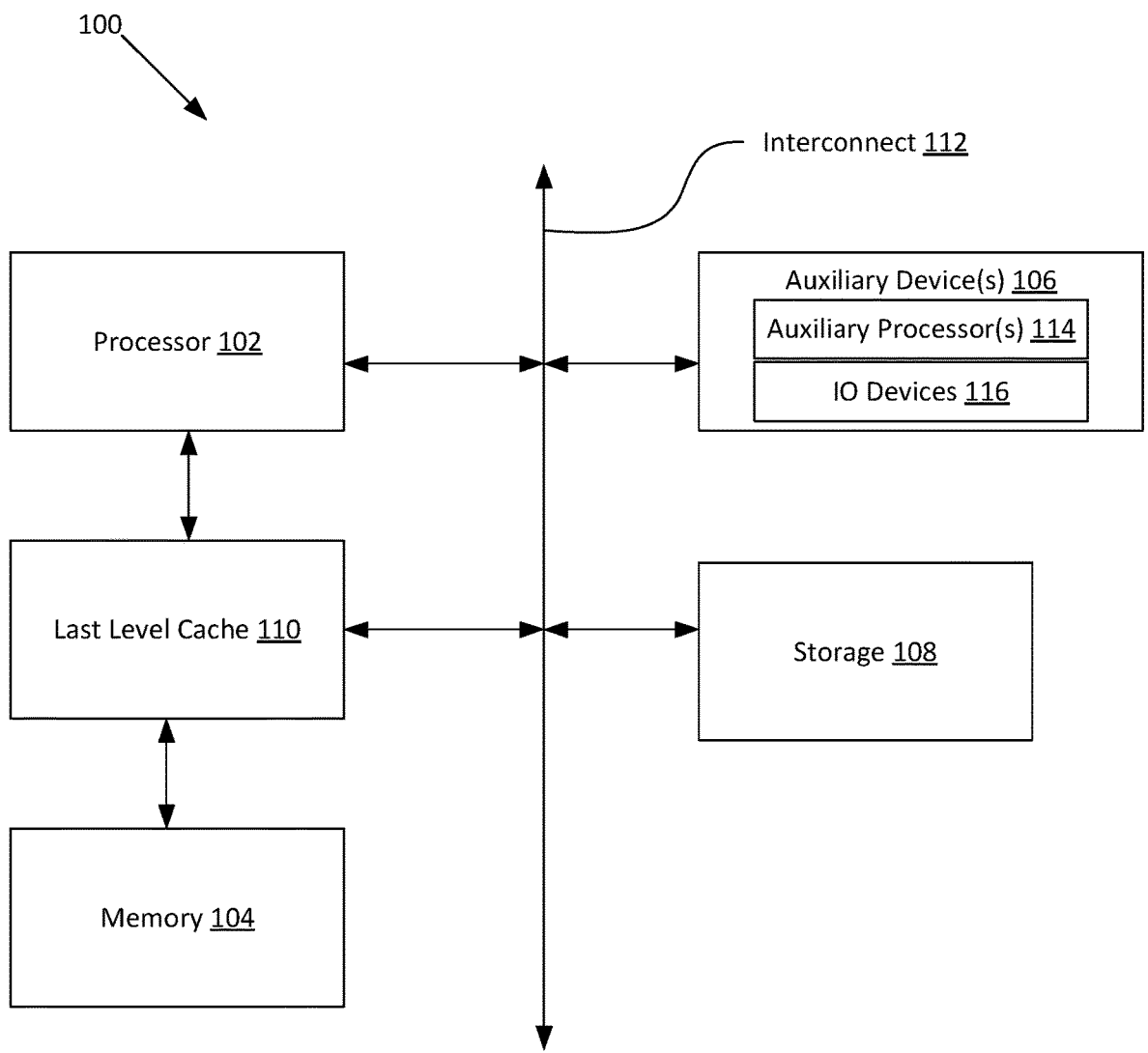
FIG. 1 is a block diagram of an example computing device in which one or more features of the disclosure can be implemented.

FIG. 1 is a block diagram of an example computing device 100 in which one or more features of the disclosure can be implemented. In various examples, the computing device 100 is one of, but is not limited to, for example, a computer, a gaming device, a handheld device, a set-top box, a television, a mobile phone, a tablet computer, or other computing device. The device 100 includes, without limitation, one or more processors 102, a memory 104, one or more auxiliary devices 106, a storage 108, and a last level cache ("LLC") 110. An interconnect 112, which can be a bus, a combination of buses, and/or any other communication component, communicatively links the one or more processors 102, the memory 104, the one or more auxiliary devices 106, the storage 108, and the last level cache 110.

In various alternatives, the one or more processors 102 include a central processing unit (CPU), a graphics processing unit (GPU), a CPU and GPU located on the same die, or one or more processor cores, wherein each processor core can be, without limitation, a CPU, a GPU, a neural processor, or another type of processor. In various alternatives, at least part of the memory 104 is located on the same die as one or more of the one or more processors 102, such as on the same chip or in an interposer arrangement, and/or at least part of the memory 104 is located separately from the one or more processors 102. The memory 104 includes a volatile or non-volatile memory, for example, random access memory (RAM), dynamic RAM, or a cache.

The storage 108 includes a fixed or removable storage, for example, without limitation, a hard disk drive, a solid state drive, an optical disk, or a flash drive. The one or more auxiliary devices 106 include, without limitation, one or more auxiliary processors 114, and/or one or more input/output ("IO") devices. The auxiliary processors 114 include, without limitation, a processing unit capable of executing instructions, such as a central processing unit, graphics processing unit, parallel processing unit capable of performing compute shader operations in a single-instruction-multiple-data form, multimedia accelerators such as video encoding or decoding accelerators, or any other processor. Any auxiliary processor 114 is implementable as a programmable processor that executes instructions, a fixed function processor that processes data according to fixed hardware circuitry, a combination thereof, or any other type of processor.

The one or more IO devices 116 include one or more input devices, such as a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals), and/or one or more output devices such as a display, a speaker, a printer, a haptic feedback device, one or more lights, an antenna, or a network connection (e.g., a wireless local area network card for transmission and/or reception of wireless IEEE 802 signals).

The last level cache 110 acts as a shared cache for the various components of the device 100, such as the processor 102 and the various auxiliary devices 106. In some examples, the last level cache 110 acts as a cache for multiple different processors. In some implementations, there other caches within the device 100. For example, in some examples, the processor 102 includes a cache hierarchy including different levels such as levels 1 and 2. In some examples, each such cache level is specific to a particular logical division of the processor 102, such as a processor core, or a processor chip, die, or package. In some examples, the hierarchy includes other types of caches as well. In various examples, one or more of the auxiliary devices 106 includes one or more caches. In some examples, the processor 102 has a direct connection to the last level cache 110.

In some examples, the last level cache 110 is "last level" in the sense that such a cache is the last cache that the device 100 attempts to service a memory access request from before servicing that request from the memory 104 itself. For example, if a processor 102 accesses data that is not stored in any of the cache levels of the processor 102, then the processor exports the memory access request to be satisfied by the last level cache 110. The last level cache 110 determines whether the requested data is stored in the last level cache 110. If the data is within the last level cache 110, the last level cache 110 services the request by providing the requested data from the last level cache 110. If the data is not within the last level cache 110, the device 100 services the request from the memory 104. As can be seen, in some implementations, the last level cache 110 acts as a final cache level before the memory 104, which helps to reduce the overall amount of memory access latency for accesses to the memory 104. Although techniques are described herein for operations involving the last level cache 110, it should be understood that the techniques can alternatively be used in other types of caches or memories.

Figure 2:
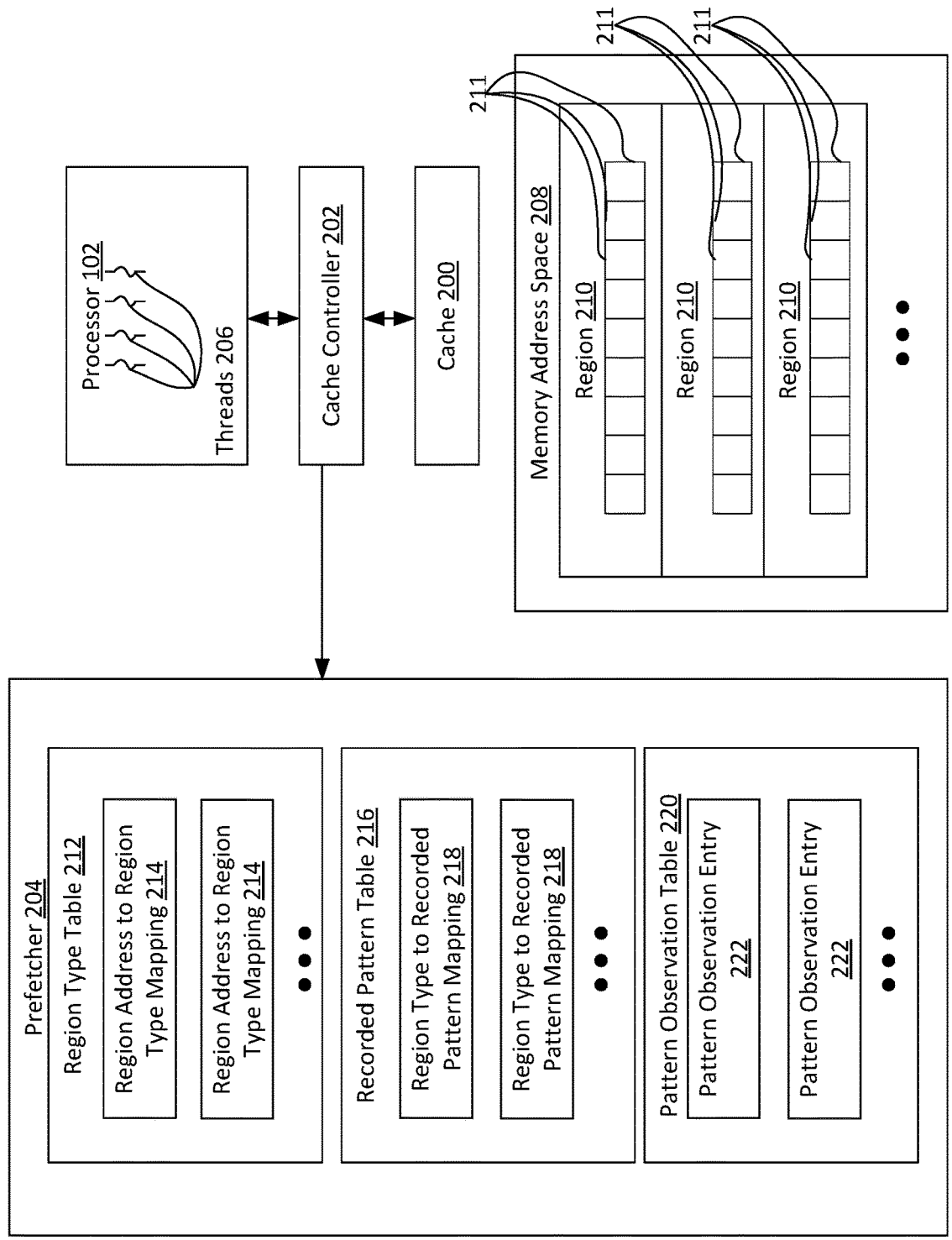
FIG. 2 is an illustration of prefetching operations for a cache, according to an example.

FIG. 2 is an illustration of prefetching operations for a cache 200, according to an example. In some examples, the cache 200 is the last level cache 110 of FIG. 1. In other examples, the cache 200 is a different memory.

The cache 200 improves access times to a backing memory (e.g., memory 104) by storing data considered likely to be used in the near future. Caches implement a variety of techniques, such as storing recently used data, to achieve this benefit. An access request can hit in the cache in the event that the requested data is within the cache. An access request can also miss in the cache in the event that the requested data is not within the cache. A cache miss is costly since the cache must fetch the data from a backing memory, which typically incurs additional processing time. Although a simple technique such as storing data when a miss occurs and evicting least recently used data provides some benefit, additional benefit can be gained by utilizing prefetching techniques.

A prefetcher 204 performs prefetching operations to prefetch data into the cache 200. The prefetcher 204 maintains a region type table 212, a recorded pattern table 216, and a pattern observation table 220. Threads 206 of a processor 102 issue memory access requests to the cache 200 through the cache controller 202. The cache controller 202 forwards information about these requests to the prefetcher 204 for the prefetcher 204 to perform prefetching operations. Each of the cache controller 202, cache 200, and prefetcher 204 are implemented partially or fully in hardware (e.g., in digital or analog circuitry or a combination thereof), partially or fully in software, or as a combination of software and hardware. The region type table 212, recorded pattern table 216, and pattern observation table 220 are data structures that are stored in one or more memories, such as hardware memory specifically dedicated to the prefetcher 204 and/or more general purpose memory not necessarily associated with the prefetcher 204.

The prefetcher 204 operates on regions 210 of a memory address space 208. The memory address space can be a physical address space or a virtual address space and is the range of addresses that can be addressed by accesses. Regions 210 of the memory address space are portions or subdivisions of the address space. The regions 210 contain region subdivisions 211, which are subdivisions of the regions. In some examples, the region subdivisions 211 are cache lines. In other examples, the region subdivision 211 each include multiple cache lines or are associated with data that is less than a cache line.

The region type table 212 stores mappings between region addresses and region types. A region address is an address of a region 210 in the memory address space 208. In some examples, the region address is the most significant bits of the first memory address within a region 210. In some examples, the number of most significant bits is sufficient to uniquely identify a region 210. In some examples, the number of such bits is the total number of bits in the addresses in the address space 208 minus the number of bits used as an offset to index into each region 210.

A region type is a type of a region for the purpose of prefetching. The prefetcher 204 allows multiple regions 210 to have the same type, and performs similar prefetching operations for different regions having the same type. The type mechanism allows for multiple regions that have the same or similar access patterns to be referenced with a single stored region access pattern. The type mechanism thus reduces the amount of data needed track access patterns as compared with a scheme in which a pattern was stored for each region regardless of the similarity of access pattern.

In operation, the prefetcher 204 records access patterns for region types into the recorded pattern table 216, using the pattern observation table 220 as a pattern construction working memory. More specifically, upon detecting a cache miss (or, in some examples, either a miss or a hit) for a region subdivision 211 within a region 210, the prefetcher 204 updates a pattern observation entry 222 if there is already one for that region 210, or creates a new pattern observation entry 222 for that region 210 if there is not already one for that region. The pattern observation entry 222 remains in the pattern observation table 220 until the entry 222 is evicted. In various examples, eviction occurs because a new pattern observation entry 222 is to be written into the pattern observation table 220 and there is no free space for such entry, because a threshold amount of time has elapsed after the entry 222 has been updated or first created, or for any other reason.

Each pattern observation entry 222 includes a region prefetch indicator for each region subdivision 211 in the corresponding region 210. Creating a new pattern observation entry 222 includes generating a new pattern observation entry 222 with all such indications not set, except for the indication associated with the region subdivision 211 for which the miss (or hit) occurred. For that indication, the prefetcher 204 sets that indication to indicate that that region subdivision 211 should be prefetched in the future. Thus, upon being created, a pattern observation entry 222 has a prefetch indicator associated with the region subdivision 211 set to indicate that prefetching should occur, and all other prefetch indicators not set, thus indicating that prefetching should not occur for those other region subdivisions 211. Herein, the phrase "prefetch indicator set" or similar phrase means that the prefetch indicator is set to indicate that prefetching should occur for the corresponding region subdivision 211 and the phrase "prefetch indicator not set" or similar phrase means that the prefetch indicator indicates that prefetching should not occur for the corresponding region subdivision 211. In the event that the prefetcher 204 detects a miss (or hit) for a region 210 for which a pattern observation entry 222 is already in the pattern observation table 220, the prefetcher 204 sets the indicator corresponding to the region subdivision 211 for which the miss (or hit) occurs.

In response to determining that eviction should occur, the prefetcher 204 evicts the pattern observation entry 222 to the recorded pattern table 216. Because the pattern observation entry 222 is updated until being evicted, when the pattern observation entry 222 is evicted, the pattern observation entry 222 includes indications to prefetch each region subdivision 211 for which a miss (or hit) occurs while that region 210 is being tracked in the pattern observation table 220. The pattern observation entry 222 does not include indications to prefetch region subdivisions 211 that have not been accessed. In effect, the prefetcher 204 has recorded a pattern of accesses for later replay.

In some examples, while recording the pattern observation entry 222, the prefetcher 204 records accesses from different threads to the corresponding region 210 into the same pattern observation entry 222. Thus, in some examples, pattern observation entries 222 track accesses from multiple threads of the same application, but do not track accesses across applications. In other words, in such examples, a single pattern observation entry 222 will not record accesses from threads of different applications. In such examples, the prefetcher 204 will maintain different pattern observation entries 222 for different applications, or will flush (e.g., clear, or save to a save-state memory) one or all of the region type table 212, recorded pattern table 216, or pattern observation table 220 in response to a context switch (e.g., in response to a change in which application is currently being executed). In some examples, an application or operating system can enable tracking accesses from different applications in the same pattern observation entries 222. In some examples, an application, operating system, or other software can specify which applications and are capable of operating together in this manner. For such "groups" of applications, the prefetcher 204 maintains shared pattern observation entries 222, but maintains separate pattern observation entries 222 for different groups or different applications not included in a group. The discussion in this paragraph of maintaining pattern observation entries 222 for different threads of an application and, optionally different applications, applies similarly, in various examples, to the other data of the prefetcher 204 (e.g., region type table 212 recorded pattern table 216). In an example, the prefetcher 204 maintains one region address to region type mapping 214 and/or one region type to recorded pattern mapping 218 for multiple threads of an application and/or for multiple applications as designated.

As described above, the recorded pattern table 216 stores region type to recorded pattern mappings 218. Each region type to recorded pattern mapping 218 includes an indication of a region type and an associated recorded pattern. The recorded pattern is a pattern of accesses to region subdivisions 211, similar to what is stored in a pattern observation entry 222. For example, a recorded pattern of a region type to recorded pattern mapping 218 stores indications of which region subdivisions 211 of a region 210 are to be prefetched. A region type to recorded pattern mapping 218 can be shared between multiple regions 210 of an address space 208. In other words, it is possible for different regions 210 to reference the same region type to recorded pattern mapping 218 and thus for prefetch operations to occur similarly for two different regions 210.

In response to a pattern observation entry 222 for a region 210 being evicted, the prefetcher 204 checks the recorded pattern table 216 for a region type to recorded pattern mapping 218 that is similar to the evicted pattern observation entry 222. Two patterns are similar in the event that the two patterns are identical (e.g., the same region subdivision indicators set) or are deemed sufficiently alike as described elsewhere herein (in an example, patterns differing by a small number of indicators are considered similar). If the prefetcher 204 finds a region type to recorded pattern mapping 218 that is similar to the evicted pattern observation entry 222, then the prefetcher 204 updates the region type table 212 accordingly. This update causes the region type table 212 to store a new region address to region type mapping 214 that maps the region 210 for which the pattern observation entry 222 was recorded to the similar recorded pattern in the recorded pattern table 216 (i.e., to the region type to recorded pattern mapping 218 that stores the similar pattern). Put differently, the update causes the region 210 to be associated with a region type that already exists in the recorded pattern table 216. Thus, after this update, the region type table 212 includes multiple entries 214, for different regions 210, each of which points to the same entry in the recorded pattern table 216. Stated differently, a region type defined in the region type table 212 is associated with a plurality of different regions 210. In this situation, the prefetcher 204 does not create a new entry 218 in the recorded pattern table 216 in response to the pattern observation entry 222 eviction because a suitable entry already exists in the recorded pattern table 216. In some examples, where eviction occurs and a similar but not identical pattern already exists in the recorded pattern table 216, the prefetcher updates that already existing pattern based on information from the evicted pattern. In some examples, the update is the bitwise and or bitwise or of the existing entry 216 and the evicted pattern.

In the event of a pattern observation entry 222 eviction where there is no similar pattern in the recorded pattern table 216, the prefetcher 204 creates a new region address to region type mapping 214 as well as a new region type to recorded pattern mapping. The new region address to region type mapping 214 maps the region address associated with pattern observation entry 222 to a region type that is not shared by any entry in the recorded pattern table 216. The new region address to region type mapping 214 maps the new region type to the recorded pattern of the pattern observation entry 222. In this situation, the prefetcher 204 creates a new region type for the region 210 as well as a new recorded pattern that is not shared by any other region.

Prefetching utilizing the prefetcher 204 is now described. In response to a miss occurring in the cache 200 (or in response to another event such as a hit or in response to a combination of misses and hits where memory bandwidth utilization is sufficiently low), the prefetcher 204 checks the region type table 212 utilizing the region address of the memory access for which the miss occurred. If the region type table 212 stores a region address to region type mapping 214 with that region address, then the prefetcher 204 examines the recorded pattern table 216 utilizing the region type of that mapping 214. The prefetcher 204 obtains a recorded pattern of accesses and prefetches the region subdivisions 211 from the backing memory of the cache 200 into the cache. The prefetching causes the data of the region subdivisions 211 to be copied from the backing memory into the cache 200. If this data is subsequently accessed, then the accesses will result in a hit in the cache 200, instead of a potential miss if the prefetch did not occur, which reduces total access time and improves performance.

Figure 3A:
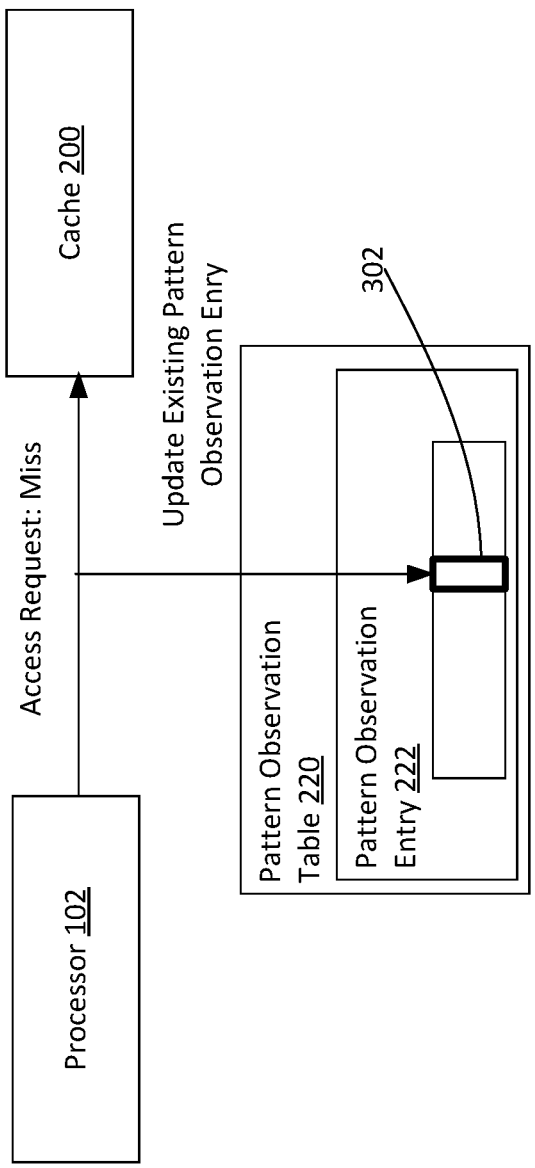
FIGS. 3A-3C illustrate operations associated with prefetching for the cache, according to examples.
Figure 3B:
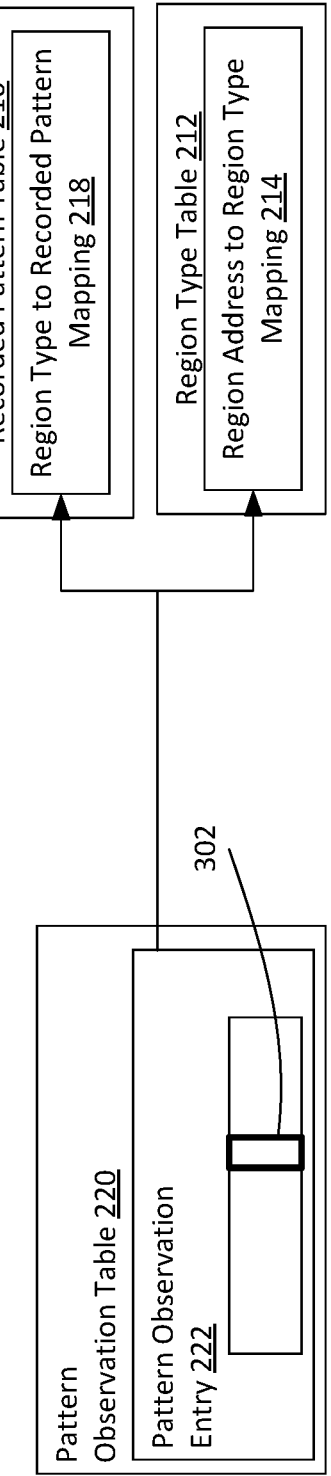
Figure 3C:
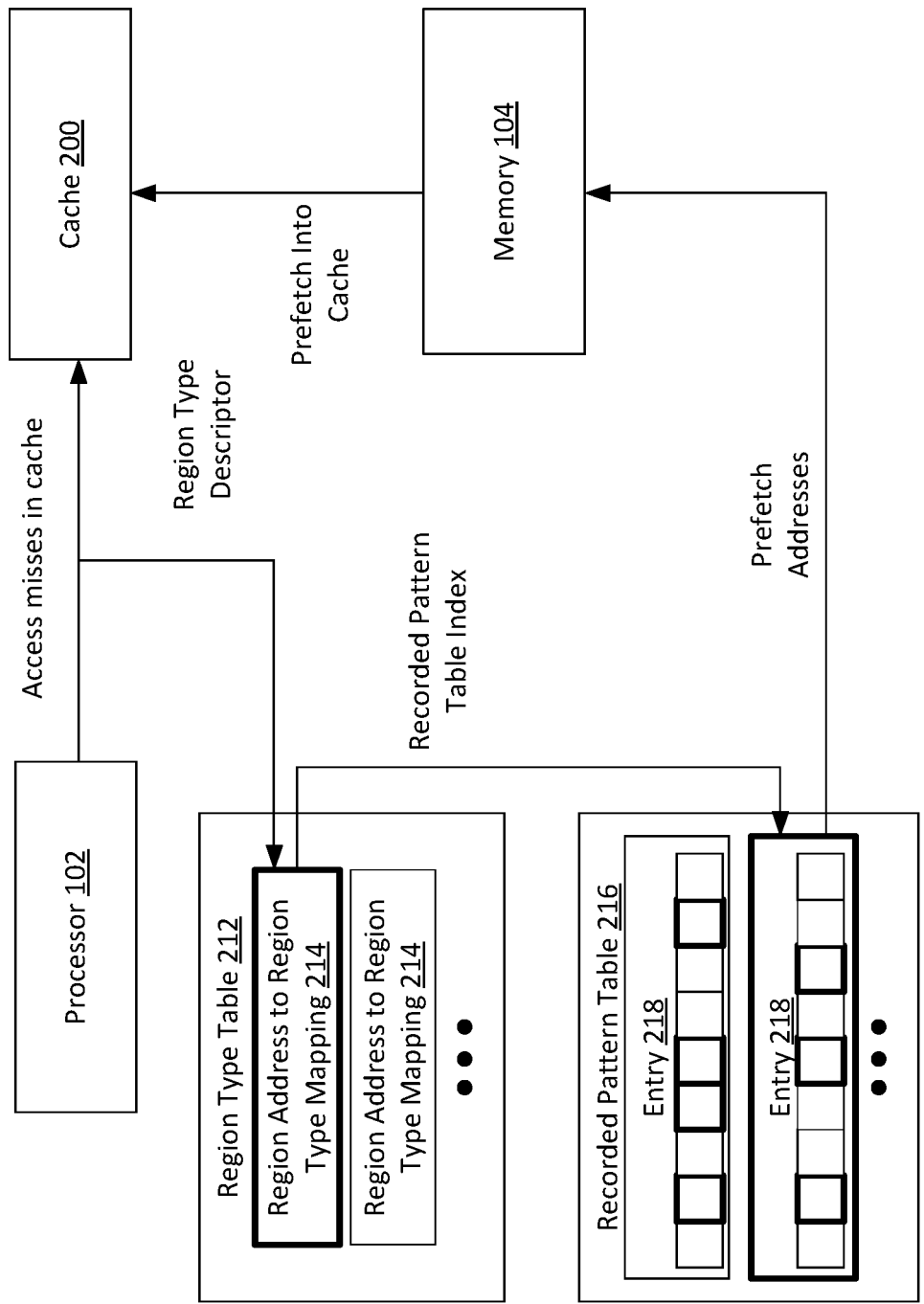

FIGS. 3A-3C illustrate operations associated with prefetching for the cache 200, according to examples. FIG. 3A illustrates operations for updating a pattern observation table 220 in response to a memory access that results in a miss. The processor 102 issues a memory access request to the cache controller 202. The cache controller 202 attempts the access request in the cache 200 and detects that a miss occurs. The cache controller examines the pattern observation table 220 and determines whether a pattern observation entry 222 for the region is present in the pattern observation table 220. In the event that such an entry exists, the prefetcher 204 sets an indication 302 in the pattern observation entry 222 corresponding to the accessed region subdivision 211 to indicate that that region subdivision 211 should be prefetched in the future. In the event that such an entry does not exist, the prefetcher 204 updates that entry to include an indication corresponding to the accessed region subdivision 211 that indicates that that region subdivision 211 should be prefetched in the future.

FIG. 3B illustrates operations for evicting entries from the pattern observation table 220, according to an example. The prefetcher 204 causes an eviction to occur from the pattern observation table 220. In various examples, eviction occurs in response to a new pattern observation entry 222 being written into the pattern observation table 220, in response to the amount of time since an update to a pattern observation entry 222 has occurred exceeding a threshold, or in response to any other technically feasible event.

In response to the eviction, the prefetcher 204 creates a new region address to region type mapping 214. This new mapping 214 maps the region address of the region associated with the evicted pattern observation entry 222 to the region type associated with a particular access pattern stored in the recorded pattern table 216. If a similar such pattern already exists, then the region address to region type mapping 214 maps the region address to an already existing type. This already existing type refers to a region type to recorded pattern mapping 218 already stored in the recorded pattern table 216. Thus, the region address is associated with a region type in the region type table 212 and that region type is associated with an already existing pattern in a region type to recorded pattern mapping 218 in the recorded pattern table 216. If a similar pattern does not already exist in the recorded pattern table 216, then in addition to creating a region address to region type mapping 214, the prefetcher 204 creates a region type to recorded pattern mapping 218 in the recorded pattern table 216. The region type to recorded pattern mapping 218 stores a new region type, as well as the access pattern of the evicted pattern observation entry 222. The region address to region type mapping 214 maps the address of the region 210 associated with the evicted pattern observation entry 222 to the new region type.

In some examples, if, upon eviction of the pattern observation entry 222, a region address to region type mapping 214 already exists for the region associated with the evicted pattern observation entry 222, then the prefetcher 204 updates the pattern recorded in the recorded pattern table 216 (that is, the recorded pattern that is included in the region type to recorded pattern mapping 218 associated with the region type of the region for which the pattern observation entry 222 is evicted). More specifically, in these examples, in the event that a pattern is already recorded within the recorded pattern able 216 for the region 210 associated with an evicted pattern observation entry 222, the prefetcher 204 updates that recorded pattern based on the evicted pattern observation entry 222. In some examples, this updating includes setting each of the indicators 302 specified by the evicted pattern observation entry within the recorded pattern in the recorded pattern table 216. Thus, after this updating, the recorded pattern stores both the indicators 302 previously stored, as well as the indicators of the pattern observation entry 222. In alternatives, the prefetcher 204 updates the pattern in the recorded pattern table 216 in any other technically feasible manner.

In some examples, in the event that a recorded pattern in the recorded pattern table 216 is updated in this manner, it is possible that regions other than the region for which an evicted occurs refer to that recorded pattern. More specifically, since a single region type maps to that recorded pattern, and multiple regions can refer to a single region type, it is possible that the updating, which is based on operations for one region, can modify a recorded pattern that is associated with multiple regions. In some examples, in this situation, the region addresses to region type mappings 214 that refer to that single region type are maintained. Because prefetching does not affect execution correctness, the simplicity of this scheme can be deemed a reasonable benefit in compensation for the downside of additional prefetches being performed. In other examples, the mappings 214 other than the one for which eviction occurred, are deleted.

In some examples, the prefetcher 204 limits the situations in which evictions of a pattern observation entry 222 results in modifications to the recorded pattern table 216 and/or region type table 212. In some examples, the limitation is that the prefetcher 204 does not update these structures with an evicted pattern observation entry 222 if the pattern observation entry 222 has a number of indicators 302 set that is less than a threshold. In other words, if the pattern recorded in the pattern observation table 220 is too sparse, then the prefetcher 204 does not update the recorded pattern table 216 or the region type table 212 and simply discards the evicted pattern observation entry 222.

FIG. 3C illustrates prefetching operations according to an example. A processor 102 issues a memory access request which misses in the cache 200. In response to the miss, the prefetcher 204 checks the region type table 212 and identifies an entry 214 that maps the address of the miss to a region type. The prefetcher 204 uses the region type to identify an entry 218 of the recorded pattern table 216. The entries 218 illustrate different access patterns, which indicate which region subdivisions 211 to prefetch. The prefetcher 204 utilizes the pattern associated with the region type to prefetch data from the memory 104 into the cache 200.

In some examples, the prefetcher 204 does not perform any prefetching operations for the entire memory address space 208. In some such examples, the prefetcher 204 examines a portion of the address of the region 210 to determine whether that region 210 is eligible to be tracked.

The structures maintained by the prefetcher 204 can run out of space. In such situations, the prefetcher 204 selects entries (for example, the region type to recorded pattern mapping 218) for eviction. In some examples, the prefetcher 204 maintains a count of regions associated with each type. In some examples, in determining which entries to evict, the prefetcher 204 selects for eviction, the entries associated with the lowest count.

In some examples, the recorded pattern table 216 is set associative. In these examples, in addition to storing the region type in an entry 214 of the region type table 212, the prefetcher 204 also stores the way of the referenced entry 218. The prefetcher 204 uses the type and way to obtain an entry 218 when prefetching. This scheme helps to prevent index collisions, where a type identifier that is already used is reused for a new pattern stored into the recorded pattern table 216. More specifically, it is likely that when a new pattern is recorded into the recorded pattern table 216, that new pattern is in a different way.

In some examples, the prefetcher 204 implements a scheme to validate recorded patterns for any given region 210. More specifically, in addition to the region type and the recorded pattern mapping, the entries 218 of the recorded pattern table 216 store a signature. The prefetcher 204 generates this signature in any technically feasible manner. In one example, when the prefetcher 204 generates a new region type to recorded pattern mapping 218 based on a pattern observation entry 222 mapping, the prefetcher 204 calculates a function of the data within the pattern observation entry 222 and stores that as the signature in both the region type to recorded pattern mapping 218 and the region address to region type mapping 214. In determining whether to prefetch the pattern indicated in a recorded pattern table entry, the prefetcher 204 checks the signature in the region address to region type mapping 214 (which is thus associated with a region address) against the signature in the region type to recorded pattern mapping 218. If there is no match, the prefetcher 204 does not perform prefetching with that data and if there is a match, the prefetcher 204 does perform the prefetching. This signature checking prevents prefetching in the situation that a recorded pattern is overwritten with new data, but the region addresses are still indicated as being associated with the corresponding region type.

In some examples, any or all of the data maintained by the prefetcher 204 is stored within the cache 200 itself, instead of in a dedicated memory. In some examples, in the event that multiple prefetching techniques are available for use for the cache 200, the prefetcher 204 disables prefetching operations (e.g., either or both of updating the data structures maintained by the prefetcher 204—the recorded pattern table 216, pattern observation table 220, and region type table 212, or utilizing that information for prefetching operations) when the prefetcher 204 determines that another prefetching technique is more beneficial. In some examples, another entity external to the prefetcher 204 informs the prefetcher that another prefetching technique is more beneficial. In other examples, the prefetcher 204 is a combined prefetcher that performs the techniques described herein and, in addition, performs other prefetching techniques.

In some examples, the prefetcher 204 utilizes bits of a pattern observation entry 222 to "predict" a recorded pattern of the recorded pattern table 216 and performs prefetching based on that predicted recorded pattern. More specifically, while the prefetcher 204 is building a pattern for a region in the pattern observation entry 222, the prefetcher 204 may observe that the pattern is somewhat similar to another pattern already within the recorded pattern table 216. In this instance, "similar" means that at least some of the indicators of a pattern observation entry 222, such as the first N indicators (where N is less than the total number of indicators in a pattern observation entry 222) are the same as the indicators of a recorded pattern in a region type to recorded pattern mapping 218. In this instance, the prefetcher 204 performs a prefetching operation using the similar recorded pattern.

In some examples, an entry 214 of the region type table 212 is shared between multiple regions 210 that have a similar prefetch pattern. In some examples, this sharing is implemented by detecting the similar prefetch pattern for multiple regions represented in the region type table 212 and causing the region type to be the same for each such region 210. In some examples, the region type is a value generated from the address of the regions 210. In some examples, to cause different regions 210, having different addresses, to be associated with the same region type, the prefetcher 204, upon detecting that the prefetch pattern for those different regions are sufficiently similar (e.g., has a number of indications that are same above a threshold number), the prefetcher 204 selects a hashing function for the region addresses that processes those region addresses to generate the same region type. In some examples, this hashing function is any technically feasible hashing function.

In some examples, one or more entries 214 of the region type table 212 store mappings from one or more region addresses to one or more region types (i.e., one or more entries 218 of the recorded pattern table 216). For any individual entry 214 of the region type table 212, along with referencing multiple entries 218 of the recorded pattern table 216, the entry 214 stores a confidence value for each entry 218 of the recorded pattern table 218. In some examples, for a mapping 214 of the region type table 212, the prefetcher 204 updates the confidence metrics for any particular referenced entry 218 of the recorded pattern table 216 in response to prefetching occurring either correctly or incorrectly with the recorded pattern table 216 entry 218. In example, if a prefetch occurs using a pattern recorded into an entry 218 of the recorded pattern table 216, and a miss occurs for the associated region 210, then the prefetcher 204 decreases the confidence for that entry 218. If, after a similar prefetch, no misses occur for that region 210, then the prefetcher 204 increases the confidence. In these examples, to perform prefetching, the prefetcher 204 examines the entry 214 of the region type table 212 using a region 210 address and obtains multiple mapped region types, each with a confidence value. The prefetcher 204 selects the region type with the highest confidence value, selects the entry 218 corresponding to that region type, and then performs the prefetching specified by that entry 218.

In some places in this document, the long form names of the entries of the region type table 212, recorded pattern table 216, and pattern observation table 220 are referred to just as "entries" or as "entries" of a particular table. It should be understood that entry 214 refers to a region address to region type mapping 214, entry 218 refers to a region type to recorded pattern mapping 218, and entry 222 refers to a pattern observation entry 222.

In some examples, to perform prefetching, the prefetcher 204 does not prefetch all region portions 211 specified by an entry 218, but instead only prefetches a subset of region portions 211 specified by an entry 218. In some examples, the prefetched region portions 211 are the region portions that are considered sufficiently close to the memory access that triggered the prefetch (e.g., within a threshold number of bytes from that address).

In some examples, to prevent duplicate prefetches, the prefetcher 204 sets a bit within an entry 218 of the recorded pattern table 216 once prefetching has begun. If that bit is set, and the prefetcher 204 would again begin prefetching using that entry 218 (e.g., due to a miss within the region 210) the prefetcher 204 does not prefetch using that entry 218. In various examples, the prefetcher 204 clears that bit when prefetching has completed, after a certain amount of time has elapsed, or after any other technically feasible event has occurred.

Figure 4A:
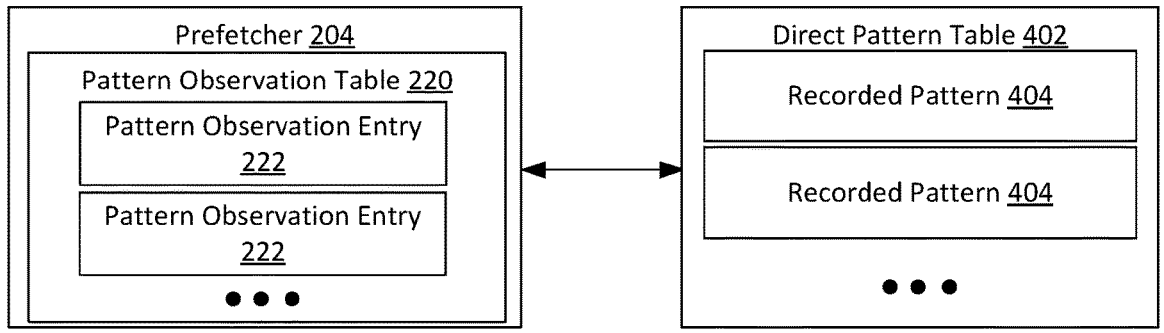
FIGS. 4A-4C illustrate operations associated with prefetching for the cache, according to additional examples.
Figure 4B:
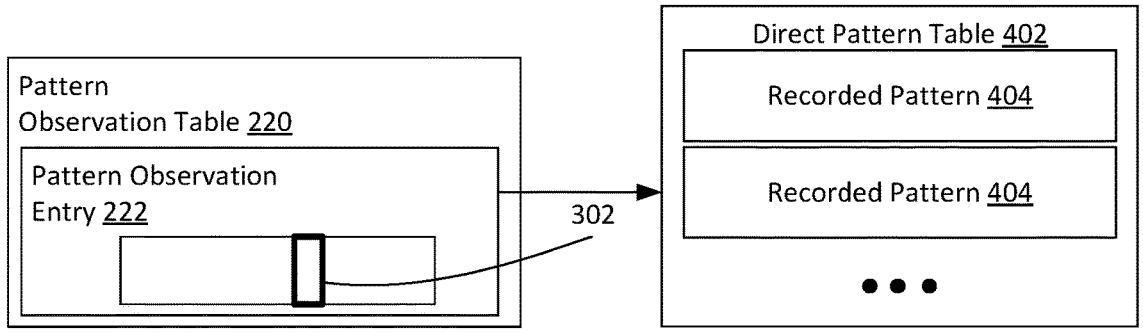
Figure 4C:
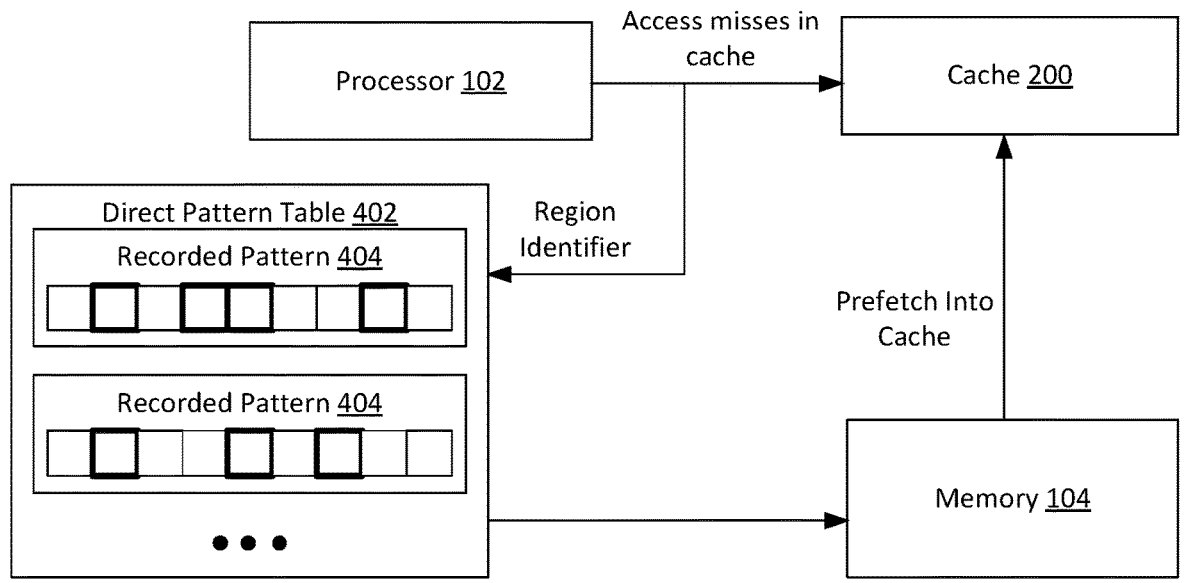

FIGS. 4A-4C illustrate an alternative technique in which pattern observation entries 222 are stored in a direct pattern table 402. In some examples, the direct pattern table 402 is stored within the cache 200 into which data is being prefetched, and in other examples, the direct pattern table 402 is stored in a different memory such as a dedicated cache memory.

FIG. 4A illustrates the coordination between the prefetcher 204 and the direct pattern table 402 to store recorded patterns 404 into the direct pattern table 402 and to utilize the recorded patterns 404 to prefetch data into the cache 200. The prefetcher 204 records pattern observation entries 222 into the pattern observation table 220 in a manner similar to that described with respect to FIGS. 2 and 3A-3C. For example, the prefetcher 204 records accesses into pattern observation entries 222 as the accesses occur and evicts the pattern observation entries 222 into the direct pattern table 402 as recorded patterns 404 when an eviction is to occur. Evictions occur for the same reasons as with respect to FIGS. 2 and 3A-3C, as described above.

FIG. 4B illustrates eviction of a pattern observation entry 222 to the direct pattern table 402. Upon eviction, the prefetcher 204 stores the recorded patterns 404 in the direct pattern table 402 in a manner that indicates which regions 210 the recorded pattern 404 is associated with. In an example, the direct pattern table 402 has a plurality of locations and each location is associated with a different region 210. Thus, the prefetcher 204 stores a recorded pattern 404 into a location associated with the region 210 of the recorded pattern 404. In another example, each location in the direct pattern table 402 can service multiple regions, and the prefetcher 204 stores additional information with the recorded pattern 404 that indicates which region 210 or regions 210 the recorded pattern 404 is for. In some examples, each location of the direct pattern table 402 is associated with a limited set of regions 210, and the stored additional information selects one of the regions 210. In some examples, the direct pattern table 402 is a set-associative cache (such as cache 200) where each set is associated with a plurality of regions 210. In such a configuration, a portion of the address of the region 210 identifies a set for placement of the recorded pattern 404. Since each set is permitted to store recorded patterns 404 for multiple regions, a different portion of the address of the region (e.g., a tag) identifies which region 210 a recorded pattern 404 is for. This tag is stored with the recorded pattern 404 in the cache 200 so that a lookup using a region address can attempt to match a tag to determine whether a set associated with the region actually contains a recorded pattern 404 for that region. Any other technically feasible mechanism for storing a recorded pattern 404 in the direct pattern table 402 in a manner that associates that recorded pattern 404 with a region 210 is possible.

FIG. 4C illustrates use of the recorded patterns 404 of the direct pattern table 402 to prefetch data into the cache 200. The recorded patterns 404 include similar information as the entries 218 of the recorded pattern table. That is, the recorded patterns 404 indicate which subdivisions 211 of a region 210 are to be prefetched when any subdivision 211 of the region 210 is accessed. In an example, a processor 102 misses in the cache 200 and the prefetcher 204 thus provides a region identifier (e.g., an address of the region) to the direct pattern table 402. The direct pattern table 402 searches the location associated with the region identifier, along with any additional information identifying the region if necessary, and finds a recorded pattern 404. The prefetcher 204 then causes the subdivisions 211 of the region 210 to be prefetched into the cache 200 in accordance with the recorded pattern 404. In some examples, prefetching occurs when a region 210 is accessed and a miss for that region occurs in the pattern observation table.

In some examples, the entirety of the cache 200 is utilized to store the direct pattern table 402, and an additional buffer (not shown) is used to store one or more pre-fetched regions. In other examples, the direct pattern table 402 and the prefetched regions share the cache 200, along with data placed into the cache for other purposes (such as a miss in the cache or memory serviced by the cache 200, leading to a cache line fill in the cache 200). In some examples, where the cache 200 is shared between the direct pattern table 402 and data for the system 100, metadata in the tag of cache entries in the cache 200 indicate whether the cache entry is an entry of the direct pattern table 402 or is a data cache line used by other components of the system 100. In such examples, the prefetcher 204 prefetches data using an entry of the cache 200 if the tag for that cache entry is a recorded pattern 404, and does not perform prefetching if the tag does not include such indication. In examples where the cache 200 is shared between the direct pattern table 402 and prefetched data, the prefetcher 204 utilizes the recorded patterns 404 to determine which data in the memory 104 to prefetch and the prefetches those portions into the portion of the cache 200 utilized by data that is prefetched.

In some examples, the prefetcher 204 modifies the direct pattern table 402 while in use based on accuracy of the recorded patterns 404. More specifically, the prefetcher 204 monitors the actual accesses to a region 210 that was prefetched into the cache 200 as compared with the recorded pattern 404 for that region to determine an accuracy of the prediction reflected by the recorded pattern 404. If the accuracy is considered low for a recorded pattern 404 (e.g., below a threshold), the prefetcher 204 records an indication that prefetches should not be made based on the recorded pattern 404 (e.g., by clearing all subdivision 211 indications of the recorded pattern 404 so that prefetching will not result in any subdivisions 211 being brought into the cache 200. In some examples, accuracy is a ratio of accurate predictions to total predictions, a ratio of accurate predictions to inaccurate predictions, a ratio of inaccurate predictions to total predictions, or any other value. In an example, an accurate prediction occurs when an access to the cache 200 hits on a subdivision 211 that is indicated as needing to be prefetched in the corresponding recorded pattern 404. In an example, a recorded pattern 404 caused a particular subdivision 211 to be prefetched into the cache 200 and a subsequent access was made to that particular subdivision 211 in the cache 200. In some examples, an inaccurate prediction is an access to a subdivision 211 that was not prefetched, due to the recorded pattern 404 not indicating that the subdivisions 211 should be prefetched. In summary, in some examples, the prefetcher 204 determines a measure of the usefulness or accuracy of a recorded pattern 404 and maintains that pattern or clears that pattern based on the accuracy. In some examples, instead of clearing the recorded pattern 404, the prefetcher 204 accelerates or decelerates the aging out of the recorded pattern 404 based on the accuracy. Aging out means removal of the recorded pattern 404 due to a replacement policy. In examples where the direct pattern table 402 is or is part of a set associative cache, a recorded pattern 404 is evicted from a set when a new recorded pattern 404 is to be stored in the direct pattern table 402. The recorded pattern 404 that is evicted depends on the age of that recorded pattern 404, and in some examples, the prefetcher 204 modifies this age based on accuracy of the recorded pattern 404, either causing recorded patterns 404 to be considered "older" (and thus evicted earlier) if less accurate or "younger" (and thus evicted later) if more accurate.

In some examples, each recorded pattern 404 is for multiple regions 210. In some such examples, the subdivision indications of the recorded pattern 404 are set if the pattern observation entry 222 for either region 210 indicates that the subdivision should be set (the indications are "ORed" together). In some such implementations, such indications are cleared periodically. In some examples, the indications are cleared randomly (i.e., with some probability) when the old indication indicates that a prefetch should occur but the new indication indicates a prefetch should not occur. In some examples, the probability with which such bits are cleared is higher when the recorded pattern 404 has more indications set and is lower when the recorded pattern 404 has fewer indications set. In another example, when a pattern observation entry 222 is evicted to a recorded pattern 404, an indication in the observation entry 222 causes a corresponding indication in the recorded pattern 404 to be set with some less than 100% probability. In some examples, this probability is related to the frequency with which the regions represented by the recorded pattern 404 is accessed. With higher such frequency, the probability is higher and with lower such frequency, the probability is lower.

In other such examples, the subdivision indications are set if the pattern observation entry 222 for both region 210 indicates that the subdivision should be set (the indications are "ANDed" together).

In some examples, the prefetcher 204 maintains a counter with each recorded pattern 404. The recorded pattern 404 is replaced or merged (e.g., ANDed or ORed) with an incoming pattern observation entry 222 only when the counter reaches a certain value (such as zero or maximum value). The counter is incremented or decremented when a pattern observation entry 222 is incoming (that is, when evicted from the pattern observation table 210 and is to be stored in the same location as the recorded pattern 404.

In some examples, a pattern observation entry 222 overwrites a recorded pattern 404 having fewer set subdivision indicators than the recorded pattern 404, causing the prefetching to be more aggressive, but does not overwrite a recorded pattern 404 having more set subdivision indicators. In other examples, a pattern observation entry 222 overwrites a recorded pattern 404 having more set subdivision indicators but not fewer set subdivision indicators than the recorded pattern 404, resulting in prefetching being less aggressive.

In some examples, pattern observation entries 222 having a number of set subdivisions lower than a threshold are not installed as a recorded pattern 404 in the direct pattern table 402.

In some examples, the prefetcher 204 monitors other parts of the system 100 (such as the processor 102, directly, e.g., via an instruction) that prefetch region subdivision and clears the corresponding subdivision indicator in a pattern observation entry 222 when installing that pattern observation entry 222 as a recorded pattern 404.

In some examples, regions that are accessed very frequently (e.g., with frequency above a threshold) do not have recorded patterns 404 installed into the direct pattern table 402.

In some examples, prefetching according to a recorded pattern 404 is limited to a portion of the region subdivisions indicated by the recorded pattern 404. In an example, instead of prefetching all of the region subdivisions of a recorded pattern 404 with set indicators, the prefetcher 204 prefetches a subset of such region subdivisions.

Figure 5:
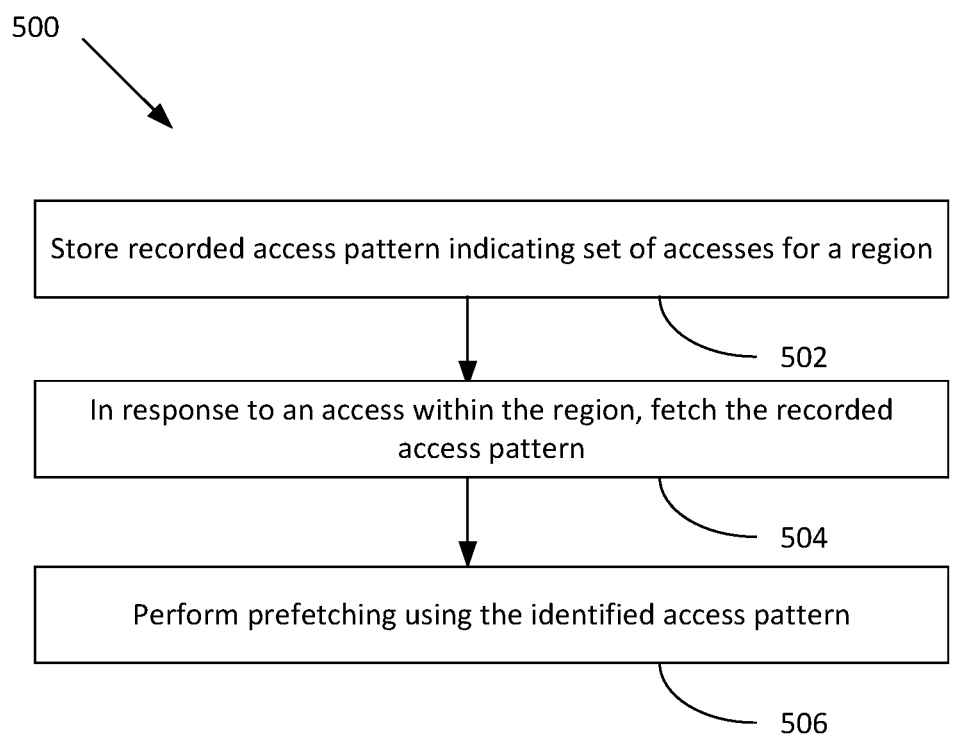
FIG. 5 is a flow diagram of a method for performing prefetching operations, according to an example.

FIG. 5 is a flow diagram of a method 500 for performing prefetching operations, according to an example. Although described with respect to the system of FIGS. 1-4C, those of skill in the art will recognize that any system, configured to perform the steps of the method 500 in any technically feasible order, falls within the scope of the present disclosure.

At step 502, a prefetcher 204 stores a recorded access pattern indicating a set of accesses for a region. A region is a portion of a memory address space for which prefetching is to occur. In some examples, the prefetcher 204 detects an access to a region and creates a pattern observation entry 222. Subsequently, the prefetcher 204 identifies additional accesses to the region and sets corresponding subdivision indicators in the pattern observation entry 222. Subsequently, the prefetcher 204 evicts the pattern observation entry 222 to a recorded pattern table 216 (with associated region type table entry 214, FIGS. 2 and 3A-3C) or to a direct pattern table 402 (FIG. 4A-4C).

At step 504, the prefetcher 204, in response to an access within a region, fetches the recorded access pattern. In an example, an access is made to a portion of the address space that is within the region. The prefetcher 204 fetches the stored access pattern for that region. In examples where the access pattern is stored in a direct pattern table 402, the prefetcher 204 directly uses the address of the region to fetch the access pattern. In examples where the access pattern is stored in a recorded pattern table 216, the prefetcher 204 obtains a region type from a region type table 212 based on a region type descriptor for the region and obtains a recorded pattern table entry 218 based on the region type.

At step 506, the prefetcher 204 performs prefetching using the identified access pattern. Prefetching includes copying the data at the addresses indicated by the access pattern from a backing memory such as the memory 104 into the cache 200.

The elements in the figures are embodied as, where appropriate, software executing on a processor, a fixed-function processor, a programmable processor, or a combination thereof. In some examples, the processor 102, last level cache 110, interconnect 112, memory 104, storage 108, various auxiliary devices 106, clients 212, memory 200, prefetcher 204, and cache controller 202 include at least some hardware circuitry and, in some implementations, include software executing on a processor within that component or within another component. In some examples, the region type table 212, recorded pattern table 216, and pattern observation table 220 are data stored within a memory such as a dedicated memory, the cache 200, or another memory.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for performing prefetching operations, the method comprising:

in response to observing an access pattern to a first memory region, storing the access pattern as a recorded access pattern;

associating a region type with the recorded access pattern and associating the first memory region with the region type;

in response to observing a second access pattern in a second memory region, wherein the second access pattern has greater than zero and less than a threshold number of differences from the access pattern, associating the second memory region with the region type;

in response to an access within the first memory region, fetching the recorded access pattern for the region type, based on the associating of the first memory region with the region type; and performing prefetching based on the access pattern.

2. The method of claim 1, wherein associating the recorded access pattern with the region type includes selecting a hashing function that maps both a first memory region and a second memory region to the region type.

3. The method of claim 2, wherein fetching the recorded access pattern is performed in response to identifying the region type based on a first region address of the first memory region.

4. The method of claim 2, further comprising identifying the recorded access pattern based on a region type for the first memory region, the identifying comprising performing a lookup in a recorded pattern table that includes entries that map region types to recorded patterns.

5. The method of claim 1, where performing prefetching based on the access pattern comprises prefetching region subdivisions specified by the access pattern.

6. The method of claim 1, further comprising:
in response to a miss within the region, updating a pattern observation table based on the miss.

7. The method of claim 6, wherein updating the pattern observation table includes, in response to no pattern observation existing for the region, generating a new pattern observation entry.

8. The method of claim 6, wherein updating the pattern observation table includes setting an indication for a region subdivision associated with the miss, wherein the indication indicates that the region subdivision is to be prefetched.

9. The method of claim 6, further comprising evicting a pattern observation entry to a recorded pattern table used for identifying the access pattern based on a region type of a first memory region.

10. The method of claim 1, wherein the region type is associated with both a first memory region and a second memory region different than the first memory region.

11. A system for performing prefetching operations, the system comprising:
a memory; and
a prefetcher configured to:
in response to observing an access pattern to a first memory region, store the access pattern as a recorded access pattern;
associating a region type with the recorded access pattern and associating the first memory region with the region type;
in response to observing a second access pattern in a second memory region, wherein the second access pattern has greater than zero and less than a threshold number of differences from the access pattern, associate the second memory region with the region type;
in response to an access within the first memory region, fetch the recorded access pattern for the region type, based on the associating of the first memory region with the region type; and
performing prefetching into the memory based on the access pattern.

12. The system of claim 11, wherein associating the recorded access pattern with the region type includes selecting a hashing function that maps both a first memory region and a second memory region to the region type.

13. The system of claim 12, wherein fetching the recorded access pattern is performed in response to identifying the region type based on a first region address of the first memory region.

14. The system of claim 12, further comprising identifying the recorded access pattern based on a region type for the first memory region, the identifying comprising performing a lookup in a recorded pattern table that includes entries that map region types to recorded patterns.

15. The system of claim 11, where performing prefetching based on the access pattern comprises prefetching region subdivisions specified by the access pattern.

16. The system of claim 11, wherein the prefetcher is further configured to:
in response to a miss within the region, update a pattern observation table based on the miss.

17. The system of claim 16, wherein updating the pattern observation table includes, in response to no pattern observation existing for the region, generating a new pattern observation entry.

18. The system of claim 16, wherein updating the pattern observation table includes setting an indication for a region subdivision associated with the miss, wherein the indication indicates that the region subdivision is to be prefetched.

19. The system of claim 16, wherein the prefetcher is further configured to evict a pattern observation entry to a recorded pattern table used for identifying the access pattern based on a region type of a first memory region.

20. A system comprising:
a plurality of processing devices;
a cache configured to service requests for access to memory made by the plurality of processing devices; and
a prefetcher configured to:
in response to observing an access pattern to a first memory region, store the access pattern as a recorded access pattern;
associate a region type with the recorded access pattern and associate the first memory region with the region type;
in response to observing a second access pattern in a second memory region, wherein the second access pattern has greater than zero and less than a threshold number of differences from the access pattern, associate the second memory region with the region type;
in response to an access within the first memory region, fetch the recorded access pattern, based on the associating of the first memory region with the region type; and
performing prefetching into the cache based on the access pattern.

21. The system of claim 20, wherein associating the recorded access pattern with the region type includes selecting a hashing function that maps both a first memory region and a second memory region to the region type.

* * * * *